US007005774B2

(12) United States Patent
Kuribayashi et al.

(10) Patent No.: US 7,005,774 B2

(45) Date of Patent: Feb. 28, 2006

(54) ROTARY CURRENT-COLLECTING DEVICE AND ROTATING ANODE X-RAY TUBE

(75) Inventors: Masaru Kuribayashi, Akishima (JP); Tomohiro Chaki, Tachikawa (JP)

(73) Assignee: Rigaku Corporation, Akishima (JP)

( * ) Notice: Subject to any disclaimer, the term of this patent is extended or adjusted under 35 U.S.C. 154(b) by 0 days.

(21) Appl. No.: 10/962,040

(22) Filed: Oct. 7, 2004

(65) Prior Publication Data

US 2005/0082936 A1 Apr. 21, 2005

(30) Foreign Application Priority Data

Oct. 17, 2003 (JP) ............................ 2003-357957

(51) Int. Cl.
*H02K 39/38* (2006.01)

(52) U.S. Cl. ...................... 310/244; 310/232; 310/239; 310/241; 378/144

(58) Field of Classification Search ........ 310/229–253; 378/15, 144, 149, 152, 196
See application file for complete search history.

(56) References Cited

U.S. PATENT DOCUMENTS

| | | | |
|---|---|---|---|
| 3,284,371 A | 11/1966 | Krellner | |
| 3,646,380 A | 2/1972 | Hartl | |
| 3,790,836 A * | 2/1974 | Braun | 378/127 |
| 4,107,563 A * | 8/1978 | Oddell | 378/126 |
| 5,018,174 A * | 5/1991 | Collins | 378/4 |
| 5,208,581 A * | 5/1993 | Collins | 340/671 |
| 5,224,138 A * | 6/1993 | Hirao et al. | 378/15 |
| 6,114,791 A | 9/2000 | Ito | |

FOREIGN PATENT DOCUMENTS

| | | |
|---|---|---|
| EP | 1 320 155 A2 | 6/2003 |
| JP | 06-153459 | 5/1994 |

* cited by examiner

*Primary Examiner*—Thanh Lam
(74) *Attorney, Agent, or Firm*—Frishauf, Holtz, Goodman & Chick, P.C.

(57) ABSTRACT

A rotary current-collecting device includes a rotary slip ring and brushes coming into sliding contact with the outer peripheral surface of the slip ring. The brush-holding ring has an inner surface to which three brush-holding springs are fixed by screws. Each of the brushes is fixed to the tip end of the brush-holding spring and is pushed against the outer surface of the slip ring under the resilient restoration force of the brush-holding spring. When the slip ring revolves, the brushes come into sliding contact with the outer peripheral surface of the slip ring. The brush is made of a metal-graphite compound consisting of 70 weight percent copper and 30 weight percent graphite. The slip ring is entirely made of glassy carbon, so that the brush abrasion can be reduced.

6 Claims, 4 Drawing Sheets

FIG. 4

| | Experiment 1 (Comparative example) | Experiment 2 | Experiment 3 |
|---|---|---|---|
| Slip ring material | Be-Cu alloy | Glassy carbon | Glassy carbon |
| Amount of slip ring abrasion | 0.04 mm / 770 hours | 0.04 mm / 1180 hours | 0.03 mm / 580 hours |
| Rate of slip ring abrasion per unit of time | 0.05 μm / hour | 0.03 μm / hour | 0.05 μm / hour |
| Amount of brush abrasion (Average) | 0.822 mm / 770 hours | 0.04 mm / 1180 hours | 0.01 mm / 580 hours |
| Rate of brush abrasion per unit of time | 1.07 μm / hour | 0.03 μm / hour | 0.02 μm / hour |

ROTARY CURRENT-COLLECTING DEVICE AND ROTATING ANODE X-RAY TUBE

BACKGROUND OF THE. INVENTION

1. Field of the Invention

The present invention relates to a rotary current-collecting device having a combination of a collector and brushes, and more especially to a rotary current-collecting device characterized by the material of the collector. The present invention also relates to a rotating anode X-ray tube having such a rotary current-collecting device.

2. Description of the Related Art

The rotary current-collecting device is known as typically a combination of a commutator and brushes as in a electric motor or a combination of a slip ring and brushes for power supply to a rotary shaft. The commutator and the slip ring are rotary members which are called as a collector. On the other hand, the brushes are stationary members which come into sliding contact with an outer peripheral surface of the collector. An electric current flows between the collector and the brushes during the sliding contact.

The collector and the brushes are made of an electrically conductive material. The collector is often made of metal while the brush is often made of graphite for a relatively high-current purpose. The lifetime of the rotary current-collecting device depends upon the amount of abrasion of the collector and the brushes, and therefore it is important for a long lifetime to select a suitable material which has a low electrical resistance during the sliding contact and shows a small amount of abrasion. A number of techniques have been developed for reducing abrasion of the rotary current-collecting device. Among those techniques, one prior art focusing attention on glassy carbon is known and disclosed in Japanese patent publication No. 6-153459 A (1994), in which the brush is made of a metal-graphite compound including graphite and copper in major components and such a brush is manufactured in a manner that graphite powder and copper powder are mixed with glassy carbon powder of less than 10 percent by weight and are then sintered. The thus manufactured brush achieves reduced abrasion of the brush and the commutator.

In the prior art described above, the addition of a small amount of the glassy carbon to the metal-graphite brush can reduce abrasion of the brush and the commutator. The reduction of abrasion is, however, inadequate. Especially, an amount of brush abrasion is large as a nearly tenfold amount of commutator abrasion.

SUMMARY OF THE INVENTION

It is an object of the present invention to provide a rotary current-collecting device achieving reduced abrasion of the collector and the brushes.

It is another object of the present invention to provide a rotating anode X-ray tube having such a rotary current-collecting device.

The present invention is characterized by the collector of the rotary current-collecting device, the collector being made of glassy carbon. A rotary current-collecting device according to the present invention includes a combination of a rotary collector having an outer peripheral surface and one or more brushes which come into sliding contact with the outer peripheral surface of the collector, and is characterized in that at least the outer peripheral surface of the collector is made of glassy carbon. If the collector is a slip ring, the outer peripheral surface of the collector is a cylindrical surface.

On the other hand, if the collector is a commutator, the outer peripheral surface is a part of a cylindrical surface.

The glassy carbon has been scarcely used as the material of mechanical parts in the past. On the contrary, the present invention is characterized in that the glassy carbon is used as the material of the collector. It is said that the glassy carbon has a poor self-lubricating property and accordingly it is not suitable for mechanical sliding parts. However, it is proved, based on the inventors' ideas and experiments, that the glassy carbon is a superior material for the collector of the rotary current-collecting device.

The properties required for the material of the collector and the brush of the rotary current-collecting device are believed to be a low friction coefficient, a low electrical resistance and a corrosion resistance, the glassy carbon satisfying these properties. The glassy carbon shows less dust generation too, it also being advantageous for the rotary current-collecting device. The combination of the collector made of the glassy carbon and the brushes made of graphite or a metal-graphite compound has useful properties of: making no oxide layer; a corrosion resistance; a low electrical contact resistance; a low friction coefficient; and less dust generation. Therefore, the combination gives a good performance as the rotary current-collecting device. The thus configured rotary current-collecting device can be incorporated into a rotating anode X-ray tube.

Since the rotary current-collecting device according to the present invention has the collector made of glassy carbon, an amount of brush abrasion is reduced, the dust generation is low, and the lifetime of the rotary current-collecting device is prolonged in comparison with the prior art.

BRIEF DESCRIPTION OF THE DRAWINGS

FIG. 4 shows a table indicating results of abrasion tests in three kinds of experiments.

DESCRIPTION OF THE PREFERRED EMBODIMENTS

Figure 1:
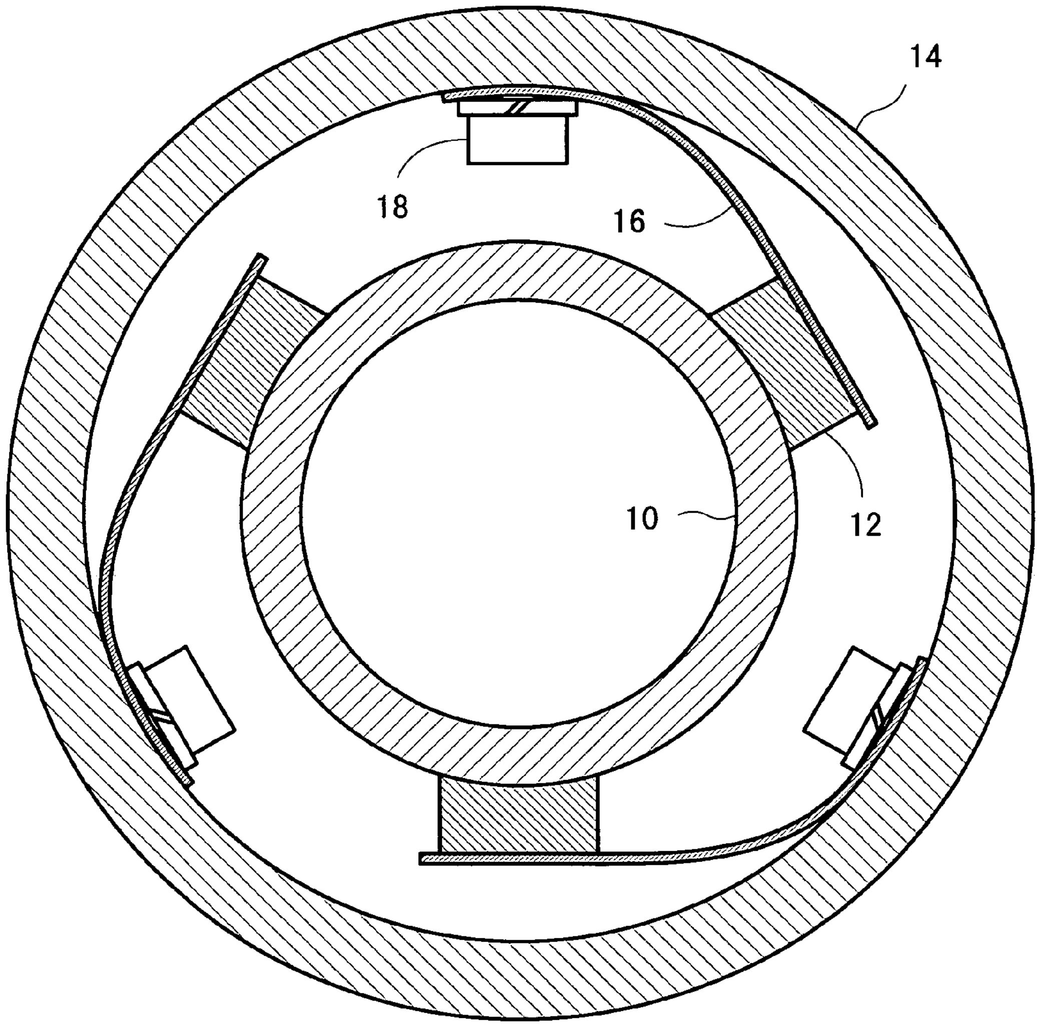
FIG. 1 is a transverse sectional view of one embodiment of a rotary current-collecting device according to the present invention.
Figure 2:
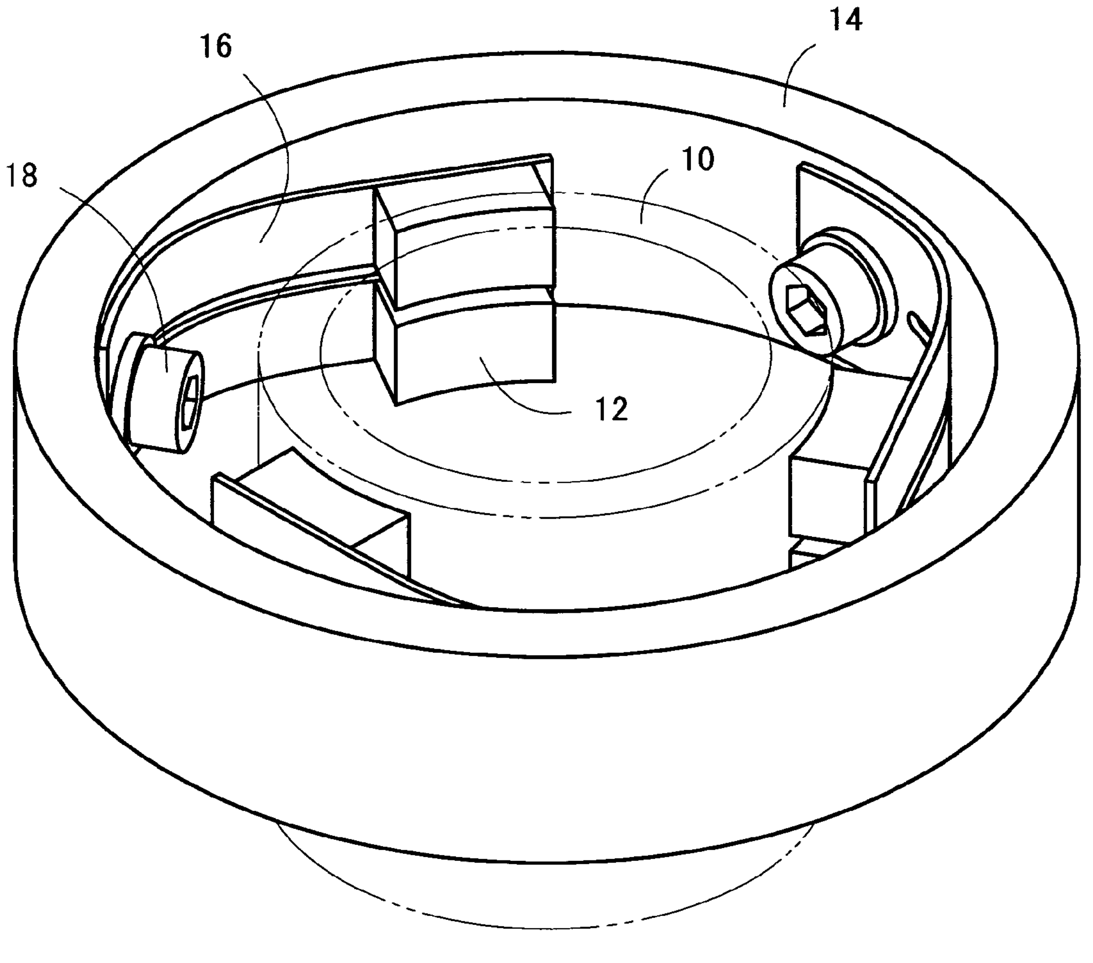
FIG. 2 is a perspective view of the rotary current-collecting device shown in FIG. 1.

Embodiments of the present invention will now be described with reference to the drawings. First, the shape of a rotary current-collecting device will be described. Referring to FIG. 1, a rotary current-collecting device has a slip ring 10 and brushes 12. The slip ring 10 has a cylindrical shape with an outside diameter of 20 mm. The outer peripheral surface of the slip ring 10 is a sliding-contact surface which is to come into sliding contact with the brushes 12. A brush-holding ring 14 has a cylindrical shape larger than the slip ring 10. The inner surface of the brush-holding ring 14 supports three brush-holding springs 16 in an equally spaced arrangement. The root of the brush-holding spring 16 is fixed to the brush-holding ring 14 by screws 18. Referring to FIG. 2, the brush-holding spring 16 has a tip end which is divided into two parts each of which fixedly supports the brush 12. The brushes 12 are pushed against the outer peripheral surface of the slip ring 10 under the resilient restoration force of the brush-holding spring 16. When the slip ring 10 revolves, the brushes 12 come into sliding contact with the outer peripheral surface of the slip ring 10.

Figure 3:
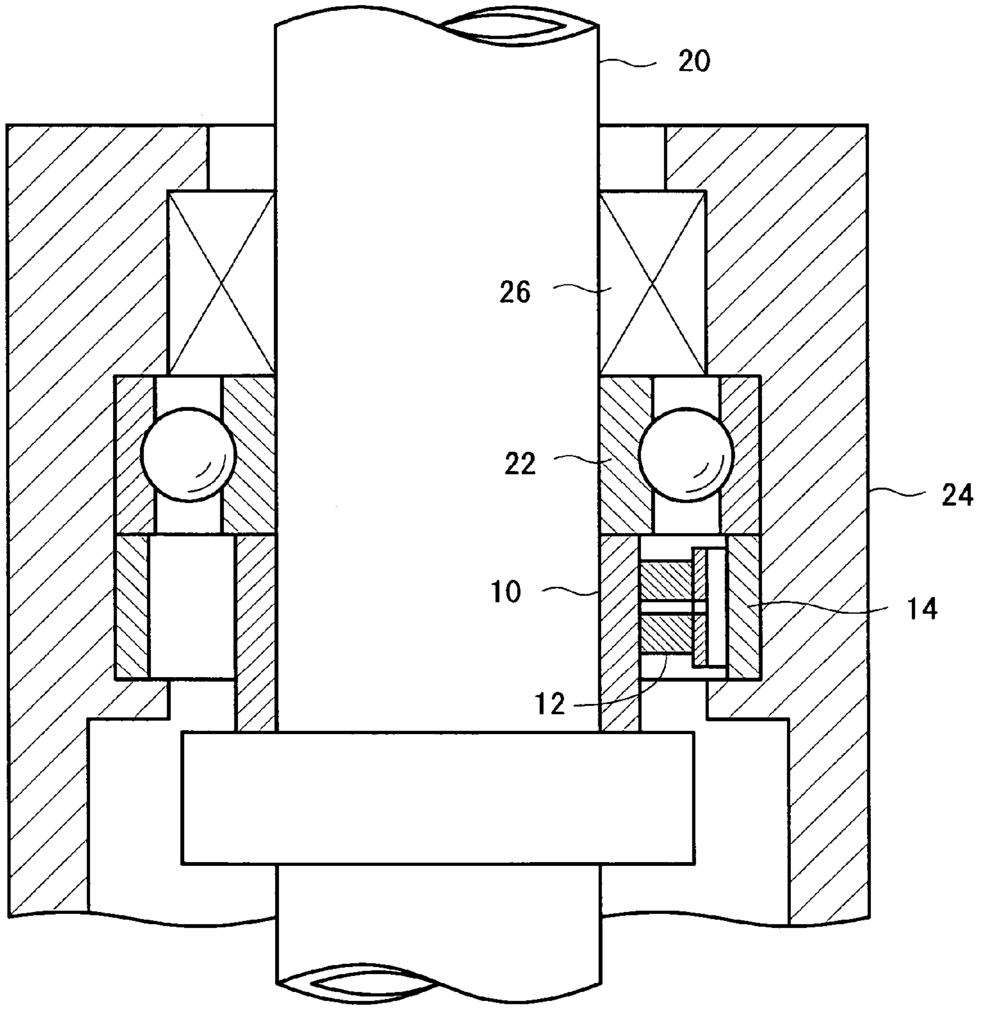
FIG. 3 is a longitudinal sectional view of a part of a rotating anode X-ray tube into which the rotary current-collecting device shown in FIG. 1 is incorporated.

The rotary current-collecting device in the embodiment is incorporated into a rotating anode X-ray tube. Referring to FIG. 3, a rotary shaft 20 is rotatably supported by bearings 22 in a housing 24. The rotary shaft 20 has a tip end, an upper end in FIG. 3, which supports a rotating anode (not shown). A magnetic fluid sealing device 26 is inserted between the rotary shaft 20 and the housing 24 for airtight seal. The slip ring 10 has an inner surface which is fixed to the outer surface of the rotary shaft 20, whereas the brush-holding ring 14 has an outer surface which is fixed to the inner surface of the housing 24. The brushes 12, which are fixed to the brush-holding springs 16 of the brush-holding ring 14, come into sliding contact with the slip ring 10. The thus configured rotary current-collecting device makes the rotary shaft 20 into electric contact with the housing 24 which is grounded. An electron beam from the cathode filament irradiates the anode of the X-ray tube to generate X-rays, and the current flowing into the anode flows through the rotary current-collecting device to the housing 24.

Next, the material of the slip ring and the brushes will be described. Referring to FIG. 1, the material of the brush 12 is a metal-graphite compound consisting of 70 weight percent copper and 30 weight percent graphite. The slip ring 10 is entirely made of glassy carbon. The slip ring 10 is manufactured in a manner that a commercially-available glassy carbon block is machined to be ring-shaped with the use of a wire electric discharge machine. The slip ring 10 is press-fitted over the outer peripheral surface of the rotary shaft 20 (see FIG. 3) so as to be fixed on the rotary shaft 20. Stating the press fitting operation in detail, the rotary shaft 20 is dipped in liquid nitrogen to be cooled down to the liquid nitrogen temperature, and then the slip ring 10 is fitted over the rotary shaft 20, followed by the temperature rise to the room temperature, completing the press fitting operation. The glassy carbon block can be manufactured, for example, by baking, in the absence of oxygen, resin having a three-dimensional network structure. The glassy carbon used in the embodiment is over 99.9 percent in purity.

The object of the present invention would be achieved if at least the outer peripheral surface of the slip ring 10 is made of the glassy carbon. Therefore, the slip ring 10 may have a cylindrical metal base, the outer peripheral surface of the base being covered with a layer of glassy carbon. An enough thickness of the layer would be about 1 mm for example.

Next, abrasion experiments on the rotary current-collecting device will be described. Three kinds of experiments have been carried out. The brush material used was the metal-graphite compound described above, common to the three kinds of experiments. The slip ring material used was as follows: in the first experiment, a comparative example, beryllium-copper alloy consisting of 1.9 to 2.15 weight percent beryllium (Be) and the balance copper (Cu); and in the second and the third experiments, the glassy carbon. The three kinds of experiments have been carried out with the common condition described below. As shown in FIG. 3, the rotary current-collecting device was incorporated into the rotating anode X-ray tube and the X-ray tube was operated in a continuous run with 0.3 A in tube current, which is equal to the current flowing through the rotary current-collecting device, and 6,000 rpm in speed of rotation of the rotary shaft 20, the peripheral speed of the slip ring 10 being 7.7 m/sec.

Referring to FIG. 4 indicating results of abrasion tests, a 770-hour continuous run was carried out in the first experiment, an amount of slip ring abrasion after the run being 0.04 mm, which can be converted into a rate of abrasion per unit of time as 0.05 μm/hour. On the other hand, an amount of brush abrasion was 0.822 mm on an average of the six brushes (see FIG. 2), which can be converted into a rate of abrasion per unit of time as 1.07 μm/hour. A 1,180-hour continuous run was carried out in the second experiment, an amount of slip ring abrasion after the run being 0.04 mm, which can be converted into a rate of abrasion per unit of time as 0.03 μm/hour. An amount of brush abrasion was 0.04 mm on an average of the six brushes, which can be converted into a rate of abrasion per unit of time as 0.03 μm/hour. A 580-hour continuous run was carried out in the third experiment, an amount of slip ring abrasion after the run being 0.03 mm, which can be converted into a rate of abrasion per unit of time as 0.05 μm/hour. An amount of brush abrasion was 0.01 mm on an average of the six brushes, which can be converted into a rate of abrasion per unit of time as 0.02 μm/hour.

Comparing the rate of abrasion per unit of time among the experiments, there is no substantial difference in slip ring abrasion between the first experiment (a comparative example) and the second and third experiments (the present invention), each abrasion being very low. On the other hand, the brush abrasion results in the second and third experiments (the present invention) are remarkably reduced to a few hundredth of that of the first experiment (a comparative example). The use of the glassy carbon for the slip ring brings the remarkable reduction in abrasion of the brushes which come into contact with the slip ring. It can be said accordingly that the usable time until brush exchange is required in the present invention would be prolonged several-dozen times longer than that of the comparative example.

An electrical resistance of the rotary current-collecting device was measured at both the start and the end of the continuous run, showing no substantial variation in each of the three kinds of experiments.

Even when the metal-graphite compound is changed for graphite as the brush material, the reduction of abrasion would be expected provided that the slip ring material is the glassy carbon.

Some conventional rotating anode X-ray tubes may utilize stainless steel as the slip ring material instead of the above-described beryllium-copper alloy. The brush abrasion would be large in this case too. The present invention is extremely superior to this conventional case too.

What is claimed is:

1. A rotating anode X-ray tube comprising:

cathode filament means emitting an electron beam;

a rotating anode which receives said electron beam to generate X-rays;

a rotary shaft which supports said rotating anode and has an outer surface;

a housing which has an inner surface and a space for accommodating said rotary shaft; and a rotary current-collecting device including (i) a slip ring which has an outer peripheral surface and an inner surface fixed to said outer surface of said rotary shaft, (ii) a brush-holding ring which has an outer surface fixed to said inner surface of said housing and an inner surface, (iii) one or more brush-holding springs each of which has a root fixed to said inner surface of said brush-holding ring and a tip end, and (vi) one or more brushes each of which is fixed to said tip end of said brush-holding spring and comes into sliding contact with said outer peripheral surface of said slip ring;

wherein at least said outer peripheral surface of said slip ring is made of glassy carbon.

2. A rotating anode X-ray tube according to claim 1, wherein said slip ring is entirely made of said glassy carbon.

3. A rotating anode X-ray tube according to claim 1, wherein said slip ring includes a cylindrical metal base having an outer peripheral surface which is covered with a layer of glassy carbon.

4. A rotating anode X-ray tube according to claim 1, wherein said brushes are made of graphite.

5. A rotating anode X-ray tube according to claim 1, wherein said brushes are made of a metal-graphite compound.

6. A rotating anode X-ray tube according to claim 5, wherein said metal-graphite compound consists of copper and graphite.

* * * * *